Nov. 19, 1968 L. M. HUBBY 3,412,002
APPARATUS AND METHOD FOR ELECTROPHORETIC BREAKING OF EMULSIONS
Filed Sept. 22, 1964
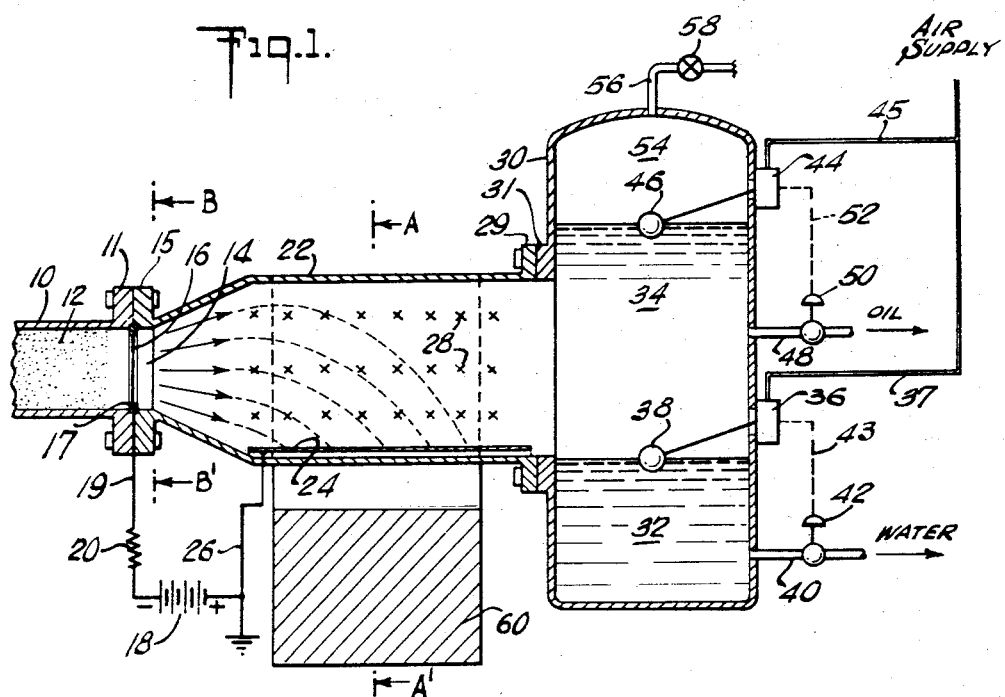
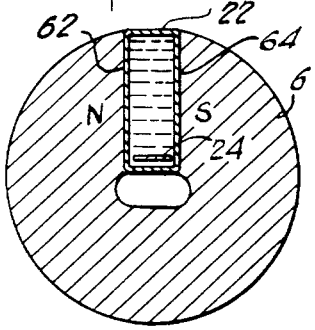
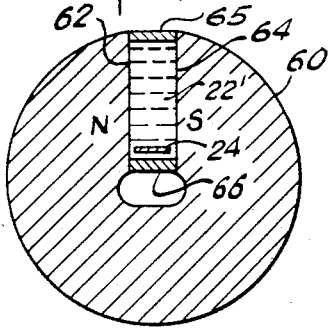
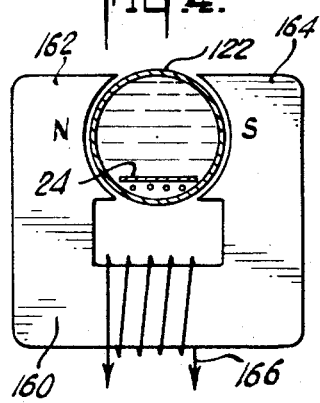
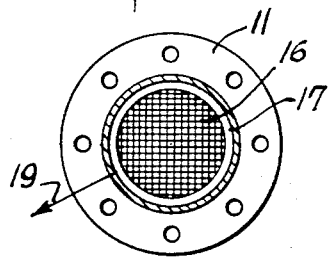
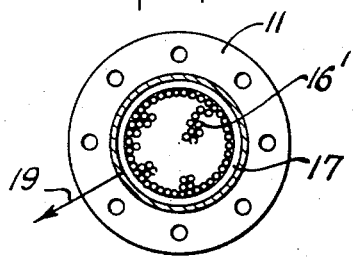

United States Patent Office 3,412,002
Patented Nov. 19, 1968

3,412,002
APPARATUS AND METHOD FOR ELECTROPHORETIC BREAKING OF EMULSIONS
Laurence M. Hubby, Bellaire, Tex., assignor to Texaco Inc., New York, N.Y., a corporation of Delaware
Filed Sept. 22, 1964, Ser. No. 398,292
18 Claims. (Cl. 204—180)

ABSTRACT OF THE DISCLOSURE

Emulsion flows through a screen electrode where particles of dispersed phase pick up a charge. A subsequent magnetic field directs these charged particles toward opposite electrode where particles are neutralized causing coalescence. Settling in tank completes the separation.

---

This invention relates to the treating of emulsions for effecting separation of the component phases thereof and particularly to the treatment of petroleum emulsions of the water-in-oil type in a unidirectional magnetic field and to apparatus therefor.

In the production of crude petroleum, the crude oil frequently is produced from the ground carrying with it water as the dispersed phase of an emulsion, the oil itself being the continuous phase. Prior to transporting the crude oil to a refinery, as by means of a pipeline, and also in the refinery itself, it is necessary to remove the emulsified water from the oil. In many instances this operation is extremely difficult to achieve, and various methods have been used in the past with varying degrees of success for breaking such emulsions.

I have discovered a new and novel method and apparatus for the treating of such water-in-oil emulsions which involves first placing an electrical charge on the individual water droplets of the dispersed phase as a stream of the emulsion flows through a conduit, and by means of a strong unidirectional magnetic field applied subsequently to the flowing stream of emulsion, the charged droplets are deflected in a direction tending to become normal to the direction of flow of the main stream and their electrical charges are then neutralized with resultant coalescence of the droplets. Coalescence of the droplets results in the formation of a liquid aqueous phase which may be separated from the resulting lighter oil phase by gravity or centrifuge.

Several different principles have been employed by the prior art for the separation of emulsions, including gravity separation as by settling or centrifuging, the application of heat, the addition of chemicals, the addition of diluents to reduce viscosity, and the use of various mechanical devices, including gun barrel tanks, water knock-out drums and so forth. More recently, electrical dehydration has been used extensively. Although several modifications of the electrical dehydration method are known, the underlying principle is the application of a high potential electrostatic field of the order of from 11,000 to 33,000 volts. Chemicals are sometimes used in conjunction with electrical dehydration in an attempt to obtain improved results. Still another method of the prior art is described in U.S. 1,978,509, which issued on Oct. 30, 1934 to C. H. M. Roberts. The method of this patent employs a magnetic field for causing the dispersed droplets to collide with one another with resulting coalescence of the droplets while still dispersed within the flowing stream. In most of the methods of the prior art, coalescence of the particles occurs in the continuous oil phase without any substantial separation of the phases prior to coalescence.

Accordingly, it is an object of this invention to provide a process and apparatus for separating water-in-oil emulsions by means of a unidirectional magnetic field.

It is also an object of this invention to apply an electrical charge to the dispersed water droplets to enhance the effect of the action of a unidirectional magnetic field.

Another object of the invention is to apply the unidirectional magnetic field in a manner such that the dispersed water droplets are deflected away from the direction of the main path of flow of the emulsion stream.

Still another object is to provide for neutralizing the charges on the deflected droplets, thereby causing them to coalesce with the resultant formation of a liquid phase which may be readily separated from the oil.

It is a still further object of this invention to provide apparatus for treating emulsions with minimum requirements for external power.

In accordance with the present invention, a flowing stream of liquid emulsion comprising a continuous phase liquid and a dispersed phase liquid is first passed into contact with an electrically charged element whereby the individual droplets of the dispersed phase of the emulsion, e.g. water, are given an electrical charge. The emulsion stream is then passed through a unidirectional magnetic field wherein the direction of the magnetic lines of force is at a right angle with the direction of flow of the emulsion with the result that the charged droplets are deflected in a direction transverse to both the direction of emulsion flow and the direction of the magnetic lines of force. The deflected charged droplets are then electrically neutralized by contact with an electrical conductor of opposite polarity to the charge carried by the droplets, causing the droplets to coalesce with the formation of a liquid phase which is non-miscible with the continuous phase. The coalesced liquid and the liquid which originally formed the continuous phase of the emulsion are then separated from each other.

Further in accordance with the invention, apparatus is provided for carrying out the aforementioned method for treating emulsions. Such apparatus may consist of a first or charging chamber containing an electrically charged metal screen or multiplicity of metal tubes stacked in layers, such as in a honeycomb or the like, through which the stream of emulsion passes. A second or deflection chamber, the walls of which are constructed of a nonmagnetic material, such as copper or a plastic material, such as Lucite or polyethylene, is connected to the output of the charging chamber to receive the emulsion flowing therethrough. This deflection chamber is further provided with an externally located magnet, preferably a permanent magnet, having its pole pieces located adjacent the walls of the deflection chamber so that its magnetic lines of force pass through the chamber at right angles to the direction of flow of the emulsion through the chamber. Inside the second chamber is provided a neutralizer plate. This plate, which is electrically connected to have a polarity opposite the polarity of the charged droplets, attracts the droplets by virtue of its opposite polarity, forms a target for the droplets deflected by the magnetic field and effects neutralization of the charge on the droplets coming into contact therewith to cause their coalescence. A third or separating chamber is additionally provided with its inlet connected to the outlet from the deflection chamber and to receive the flowing streams of oil and water therefrom and wherein the oil and water phases of the emulsion are separated to yield each phase in concentrated form.

For a better understanding of the invention, attention is directed to the following detailed description and accompanying drawings. The features of the invention which are believed to be novel are particularly pointed out in the appended claims.

In the drawings:
FIGURE 1 is a vertical sectional view of an emulsion treating apparatus in accordance with the present invention.

FIG. 2 is a cross-sectional view along lines A–A' of FIG. 1 showing a magnet located externally to a rectangular cross-section type of deflection chamber.

FIG. 3 is also a cross-sectional view along line A–A' of FIG. 1 showing a rectangular cross-section type of deflection section wherein the faces of the magnet pole pieces form two walls of the deflection chamber.

FIG. 4 is a cross-sectional view similar to FIG. 2 and showing an electromagnet located externally to a cylindrical cross-section type of deflection chamber.

FIG. 5 is a sectional view along line B–B' of FIG. 1 showing a screen-type droplet charging element.

FIG. 6 is a sectional view similar to FIG. 4 showing a stacked tubing type of droplet charging element.

Referring now to FIG. 1 of the drawing, numeral 10 represents an emulsion feed line or conduit having a flange 11 at one end thereof and containing a water-in-oil type of emulsion 12 flowing therethrough. Droplet charging chamber 14 is shown as the volume formed by flange 11 on the end of feed line 10 and flange 15 which connect droplet deflection chamber 22 with feed line 10. Obviously, charging chamber 14 could be an additional length of conduit if so desired. Droplet charging chamber 14 contains a perforate or foraminous droplet charging element 16 which may be in the form of a metal screen (as shown in FIG. 5) or a composite of electrically connected metal tubes (as shown in FIG. 6) through which the emulsion 12 passes. Droplet charging element 16 is held in place within chamber 14 by means of insulator ring 17 and is connected to one terminal of battery 18 by means of electrical conductor 19 and current limiting resistor 20. Droplet deflection chamber 22 is connected to charging chamber 14 by means of flange 15. Deflection chamber 22 is constructed of a non-magnetic material in order to permit the passage of magnetic lines of force through its interior volume. Suitable materials are metals such as brass, copper, etc. and plastics such as Lucite, epoxy, etc. Deflection chamber 22 is provided with a neutralizing element 24 located adjacent the bottom wall thereof (for water-in-oil emulsions) and electrically connected to the other terminal of battery 18 by means of electrical conductor 26. With neutralizing element 24 located adjacent the bottom wall for water-in-oil emulsions, the force of gravity complements the magnetic deflecting force and aids in the separation of the water droplets. In the drawing, charging element 16 is shown as being connected to the negative terminal of battery 18 and neutralizing element 24 is shown connected to the positive terminal which is also grounded. While these polarity connections are preferred, they may, if desired, be reversed so that charging element 16 is connected to the positive terminal and neutralizing element 24 connected to the negative terminal. Horizontal lines of force 28 produced by an externally located magnet are shown in FIGURE 1 as being normal to the plane of the figure by small crosses. The crosses indicate the direction of the lines of force is into the plane of the figure. If the battery polarity is reversed as discussed above, the poles of the magnet would have to be reversed and the direction of the lines of force would be reversed. Separating chamber 30 is connected to the output side of the deflection section 22 by means of flanges 29 and 31 and is shown as having a lower layer of separated liquid 32 which originally comprised the dispersed phase of the emulsion 12. The separated continuous phase 34 comprising crude oil or a petroleum product, has a lower density than the dispersed or water phase and floats on top of the coalesced dispersed phase 32.

Liquid level controller 36 is mounted on the outside of the lower portion of separator 30 with its associated float 38 extending to the inner portion of the separator so that it is free to float on the surface of the separated dispersed or water phase 32. Water draw-off line 40 is attached to the bottom section of separator 30. Remote control valve 42 is located in water draw-off line 40 and is connected to controller 36 by means of control linkage 43, which may be electrical, pneumatic or mechanical as desired.

Liquid level controller 44 is mounted externally on the upper portion of separator 30 with its associated float 46 extending to the inner portion of the separator so that it is free to float on the surface of the separated continuous or oil phase 34. Oil draw-off line 48 is attached above the plane of the oil-water interface. Remote control valve 50 is located in oil draw-off line 48 and is connected to controller 44 by means of control linkage 52, which may be electrical, pneumatic or mechanical as desired.

A vapor space 54 is provided in the upper portion of separator 30 and a vapor vent line 56 is mounted in the top of separator 30 to permit the withdrawal of vapors. Valve 58 is located in vent line 56 and serves to hold a back-pressure on the separator if so desired.

Also shown in FIGURE 1 as being located externally and adjacent to deflection chamber 22 is magnet 60. Magnet 60 is preferably a permanent magnet in order to minimize external power requirements, but an electromagnet may be employed if desired. The relative position as well as one type of design for magnet 60 is shown in FIG. 2 wherein deflection chamber 22 is shown as having a rectangular cross-section with its width much smaller than its height for the purpose of achieving a shorter path for the lines of force through the non-magnetic deflection section 22 and hence a stronger and more uniform magnetic field. Magnet 60 is located externally with respect to chamber 22 with its poles 62 and 64 horizontally spaced on opposite sides thereof so as to produce substantially horizontal lines of force passing through the chamber.

FIGURE 3 shows a modified form of FIG. 2 wherein the faces of the pole pieces 62 and 64 of magnet 60 form two walls of deflection chamber 22'. Brass inserts 65 and 66 form the other two walls of the deflection chamber 22'. This type of structure avoids the necessity for locating a conduit between the pole pieces and permits operation with a minimum spacing between the pole pieces thus making it possible to realize maximum field strength for a given strength magnet.

FIGURE 4 shows an alternative design for a deflection section 122, in this case employing an associated electromagnet 160. In this modification the deflection section 122 is shown as being circular in cross section. Electromagnet 160 with its activating coil 166 is located externally to section 122 such that the magnet poles 162 and 164 are horizontally spaced adjacent to opposite sides of section 122 the magnetic lines of force are horizontal and substantially equal so as to produce substantially horizontal line of force throughout the area of section 122.

FIGURES 5 and 6 show alternative types of droplet charging element in a sectional view through section B–B'. In FIGURE 5, droplet charging element 16 is shown as a grid or screen of interconnected wires held in position in flange 11 and insulated therefrom by insulator 17. Electrical lead 20 connected internally to element 16 passes through the joint portion of flange and is connected to one side of battery 18 as shown in FIG. 1. In FIG. 6, droplet charging section 16' is made up of a number of short tubes electrically interconnected and stacked adjacent each other to substantially fill the area within insulator 17.

In operation, a water-in-oil emulsion such as a crude oil emulsion or the like, is fed to the apparatus by means of feed line 10 and passes first into droplet charging section 14 where it passes through perforate charging element 16 which is electrically charged with a negative potential in the range of 1000 to 10,000 volts supplied by a source of voltage indicated in FIGURE 1 as battery 18.

In passing through perforate droplet charging member 14, the dispersed droplets become electrically negatively charged. The emulsion containing electrically charged water droplets enters deflection section 22. The direction of flow of the emulsion stream is lengthwise of the section 22 whereas the magnetic lines of force produced by external magnet 60 pass horizontally through section 22 from one side to the other in a direction perpendicular to the direction of flow of the emulsion. The charged droplets are acted upon by the magnetic field and are deflected downwardly in a direction which is normal or transverse to both the emulsion flow and the direction of the lines of force. Thus, the path taken by the droplets is in the form of an arc toward neutralizing member 24. Best results are obtained and separation is enhanced when relatively high fluid flow velocities are employed in deflection section 22. In a system of this type, the deflecting force is proportional to the velocity of the charged droplet through the magnetic field. Consequently, the rectangular cross-section deflection section shown in FIGURES 2 and 3 is advantageous not only because this design permits closer spacing of the magnet pole pieces with resulting maximum field strength within the deflection section, but also results in increased linear velocities of the emulsion through the deflection section.

The electrical charges on the droplets reaching member 24 are neutralized since this member is held at ground potential and connected to the positive side of voltage supply 18. As a result of neutralization of the charges on the droplets, coalescence is effected until a continuous separated phase is formed from the droplets originally dispersed in the emulsion. This separated liquid phase flows along the bottom of the deflection section 22 as a bottom layer distinct from the upper oil layer flowing along therewith to settling tank 34 where it collects in the bottom of that tank. The main body of the emulsion, that is, the continuous or oil phase, also flows into settler 34 and floats on the heavier aqueous liquid obtained from the dispersed phase. The continuous or petroleum phase in the settler is substantially free of water.

The operation of the settler is controlled by liquid level devices 36 and 44. A pneumatic controller 36 in an air line 37 is operated by float 38 and controls the level of the separated dispersed phase in the settler by operating valve 40 in the water draw-off line 42. The level of the oil phase in settler 34 is controlled by a liquid level controller such as a pneumatic controller 44 in an air line 45, which is operated by float 46 to control the operation of valve 48 in oil draw-off line 50. Vent 52 and pressure release valve 54 in the top of settler 34 are provided to release any gases which separate from the petroleum phase during the treating process. The oil drawn off from the settler is substantially free of water and is suitable for custody transfer to a pipeline or running to tankage or for processing in refinery equipment. The water ordinarily is run to ditch or other disposal.

In treating emulsions with the method and apparatus of my invention, it is possible to effectively and economically break or dehydrate petroleum emulsions which are difficult to handle with the methods of the prior art. Several factors influence the effectiveness of the separation of the water and oil phases. One of these is the voltage used for charging the dispersed droplets. The higher the voltage charge on the droplets, the more responsive the droplets will be to the magnetic effect on them during their subsequent passage through the electromagnetic field. However, practical limitations are encountered as a result of the electrical conductivity of the emulsion itself and as a practical matter voltages in the range of 1000 to 10,000 may be employed to obtain satisfactory operation in the deflection section.

In accordance with the principle of operation of this invention the higher the stream velocity, the greater will be the deflecting force. Consequently, separation of the charged droplets from the main stream of the emulsion is enhanced as the velocity of the stream increases. In view of this, it is desirable that the cross-sectional area of the deflection chamber be of such dimensions as to insure a relatively high velocity of the emulsion stream through the chamber. The elongated cross-section of the deflection chambers shown in FIGURES 2 and 3 provides a suitable geometrical shape for achieving the desired stream velocity.

The shape of the magnet employed for deflecting the droplets should be such as to produce a relatively uniform, high intensity magnetic field throughout the deflection chamber 22. This is more nearly achieved with the apparatus of FIGURES 2 and 3, but satisfactory results can be obtained with the modification of FIGURE 4 as well. The stronger the magnetic field, the greater will be the deflecting effect on the droplets and for practical purposes a field strength in the order of 1000 to 5000 gauss may be employed effectively.

Neutralizing member 24 may be either a solid metallic pate, a metallic screen or any suitable design which will expose a large surface area to the deflected droplets. Although the use of a permanent magnet is preferred because they do not require external power, electromagnets also may be employed if so desired.

Obviously, many types of separating chambers may be employed for separating the resulting oil and water and the particular type shown in FIGURE 1 should be considered as merely being representative.

While specific embodiments have been shown and described, it will be understood that various modifications may be made without departing from the principles of the invention. The appended claims are, therefore, intended to cover any such modifications within the true spirit and scope of the invention.

I claim:

1. A process of separating the dispersed and continuous phases of a flowing stream of a liquid emulsion which comprises subjecting said emulsion to a unidirectional voltage thereby placing an electrical charge on the particles comprising the dispersed phase of said emulsion in a first zone without substantial coalescence of said particles, passing said electrically charged emulsion through a unidirectional magnetic field in a second zone wherein the magnetic lines of force are perpendicular to the direction of flow of said emulsion to cause deflection of said dispersed phase, neutralizing the electrical charge on said particles of said dispersed phase deflected by said magnetic field to obtain coalescence thereof, and separating the coalesced liquid and the continuous phase of said emulsion from one another in a third zone.

2. A process in accordance with claim 1 wherein an electrical charge is placed on said particles of said dispersed phase by passing said emulsion through openings in a conductive foraminous element charged with a unidirectional electrical potential in the range of 1000 to 10,000 volts.

3. A process in accordance with claim 1 wherein the electrical charge on said deflected dispersed phase is neutralized by bringing said deflected phase in contact with an electrically charged conductor of opposite polarity.

4. A process in accordance with claim 1 wherein said emulsion is crude oil containing dispersed water particles and wherein said water particles are deflected downwardly and coalesced to form a distinct water phase flowing along the bottom of said second zone.

5. Apparatus for treating liquid emulsions in a continuously flowing stream comprising in combination: electrical means for placing an electrical charge on the particles comprising the dispersed phase of said emulsion without substantial coalescence, magnetic means for providing a field traverse to the path of said flowing stream for directing the path of the electrically charged particles of said dispersed phase of said emulsions towards an electrode means, arranged generally parallel to the path of said stream, for neutralizing the electric charge on said charged particles of said dispersed phase to cause coalescence thereof, and means for separating said coalesced dispersed phase from said continuous phase.

6. Apparatus in accordance with claim 5 wherein said electrical means comprises a screen through which said emulsion passes.

7. Apparatus in accordance with claim 5 wherein said electrical means comprises a bundle of tubes through which said emulsion passes.

8. Apparatus for separating the dispersed and continuous phases of a liquid emulsion in a flowing stream comprising in combination, a conduit containing said flowing stream of emulsion, a first chamber connected to said conduit and containing an electrically charged pervious member insulated therefrom for placing an electrical charge on the individual particles comprising said dispersed phase without substantial coalescence as said emulsion passes therethrough, a second chamber constructed of a non-magnetic material connected to the outlet of said first chamber, a magnet disposed externally to said second chamber and having its pole pieces located adjacent the walls of said chamber such that the magnetic lines of force pass through said flowing stream of emulsion at right angles to the direction of flow of said stream, a neutralizing member positioned within said second chamber such that said electrically charged dispersed phase particles acted upon by the field of said magnet, contact said member and are coalesced, and a third chamber connected to the output of said second chamber and having separate outlets for said continuous phase and said dispersed phase.

9. Apparatus in accordance with claim 8 wherein said third chamber has upper and lower discharge conduits with means for automatically controlling the flow of fluid through said conduits in accordance with two liquid levels in said third vessel.

10. Apparatus in accordance with claim 8 wherein said electrically charged member and said neutralizing member are electrically connected to opposite poles of a common source of electrical current.

11. Apparatus in accordance with claim 8 wherein said magnet is a permanent magnet.

12. Apparatus in accordance with claim 8 wherein said second chamber is rectangular in cross-section and said pole pieces of said magnet have flat surfaces adapted to fit against the outer wall of said second chamber.

13. Apparatus in accordance with claim 8 wherein said second chamber is circular in cross-section and said pole pieces of said magnet have concave surfaces adapted to fit against the outer wall of said second chamber.

14. Apparatus comprising a system for coalescing the dispersed phase of an emulsion from the continuous phase thereof including a first region and a second region through which emulsion in said system may pass in that order, means for subjecting said emulsion in said first region to an electric charge of predetermined polarity, means for flowing said emulsion subjected to said charge in said first region through said second region, means for subjecting emulsion flowing through said second region to a magnetic field having flux lines oriented transverse to the direction of flow of said emulsion through said second region, thereby to coalesce the disperse phase of said emulsion, and means for separating said coalesced phase and the continuous phase of said emulsion from one another.

15. Apparatus as defined in claim 14 wherein said means for separating said coalesced phase from said continuous phase comprises means for separating said phases from one another according to their respective densities.

16. Apparatus as defined in claim 14 wherein separating means comprises a settling tank and first and second means for withdrawing said respective phases.

17. Apparatus as defined in claim 14 wherein said second region comprises a fluid flow chamber of relatively smaller cross section as compared with the cross section of said first region whereby the velocity of flow in said second region is relatively high as compared with the velocity of flow in said first region.

18. Apparatus as defined in claim 14 wherein said magnetic field is oriented to direct the denser of said coalesced phase and said continuous phase toward the bottom of said second region, wherein said means for separating said coalesced phase from said continuous phase comprises a third region comprising a settling tank and wherein said settling tank includes means for withdrawing the denser phase from the bottom of said tank and the lighter phase from a higher region thereof.

References Cited

UNITED STATES PATENTS

| | | | |
|---|---|---|---|
| 1,405,127 | 1/1922 | Harris | 204—188 |
| 1,405,128 | 1/1922 | Harris | 204—188 |
| 1,559,035 | 10/1925 | Egloff et al. | 204—188 |
| 1,949,660 | 3/1934 | Roberts | 204—188 |
| 2,033,567 | 3/1936 | Worthington | 204—188 |

HOWARD S. WILLIAMS, *Primary Examiner.*

A. C. PRESCOTT, *Assistant Examiner.*